United States Patent
Scaramucci

[11] Patent Number: 5,181,535
[45] Date of Patent: Jan. 26, 1993

[54] COMPACT SWING CHECK VALVE

[76] Inventor: John P. Scaramucci, 10724 Woodridden, Oklahoma City, Okla. 73170

[21] Appl. No.: 893,218

[22] Filed: Jun. 2, 1992

Related U.S. Application Data

[60] Division of Ser. No. 783,722, Oct. 25, 1991, which is a continuation of Ser. No. 430,169, Nov. 1, 1989, abandoned, which is a continuation-in-part of Ser. No. 286,979, Dec. 20, 1988, Pat. No. 4,982,759.

[51] Int. Cl.$^5$ .............................................. F16K 15/03
[52] U.S. Cl. .................................. 137/515.5; 137/527.8
[58] Field of Search .................. 137/515.5, 454.2, 527, 137/527.8

[56] References Cited

U.S. PATENT DOCUMENTS

| | | | |
|---|---|---|---|
| 3,933,173 | 1/1976 | Kajita | 137/527.8 |
| 4,201,241 | 5/1980 | Schertler | 137/527 |
| 4,230,150 | 10/1980 | Scaramucci | 137/527.8 X |
| 4,257,444 | 3/1981 | Ogle | 137/454.2 |
| 4,284,097 | 8/1981 | Becker | 137/454.2 |

*Primary Examiner*—Robert G. Nilson
*Attorney, Agent, or Firm*—Dunlap, Codding, Lee

[57] ABSTRACT

A swing check valve including a body, a seat ring, a cage ring and a retainer ring. The cage ring supports a disc and the seat ring has a seating portion facing downstream to mate with the disc. The body has an upstream end, a downstream end and a bore interconnecting the upstream and downstream ends. The bore includes an annular shoulder facing downstream toward an annular groove formed in the bore to receive the retainer ring. An annular shoulder on the seat ring mates with the annular shoulder of the bore and the retainer ring engages the cage ring to position the seat ring and cage ring in a medial portion of the bore.

6 Claims, 4 Drawing Sheets

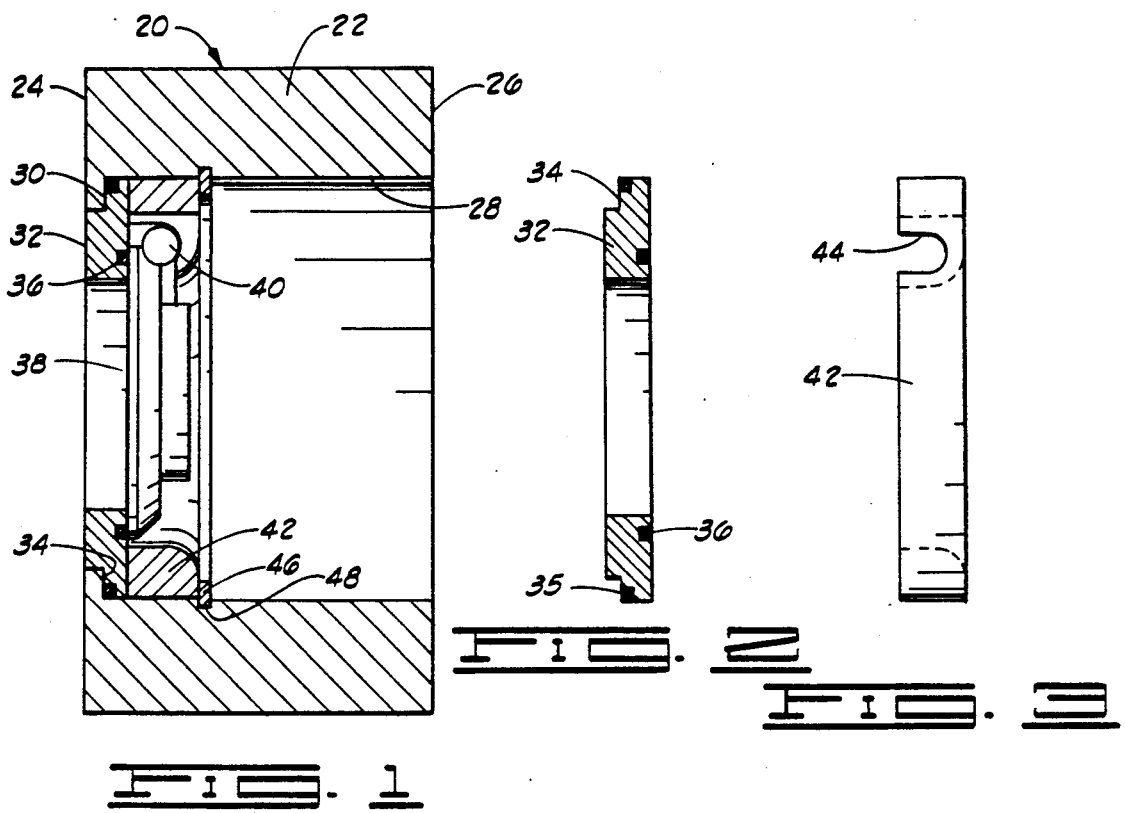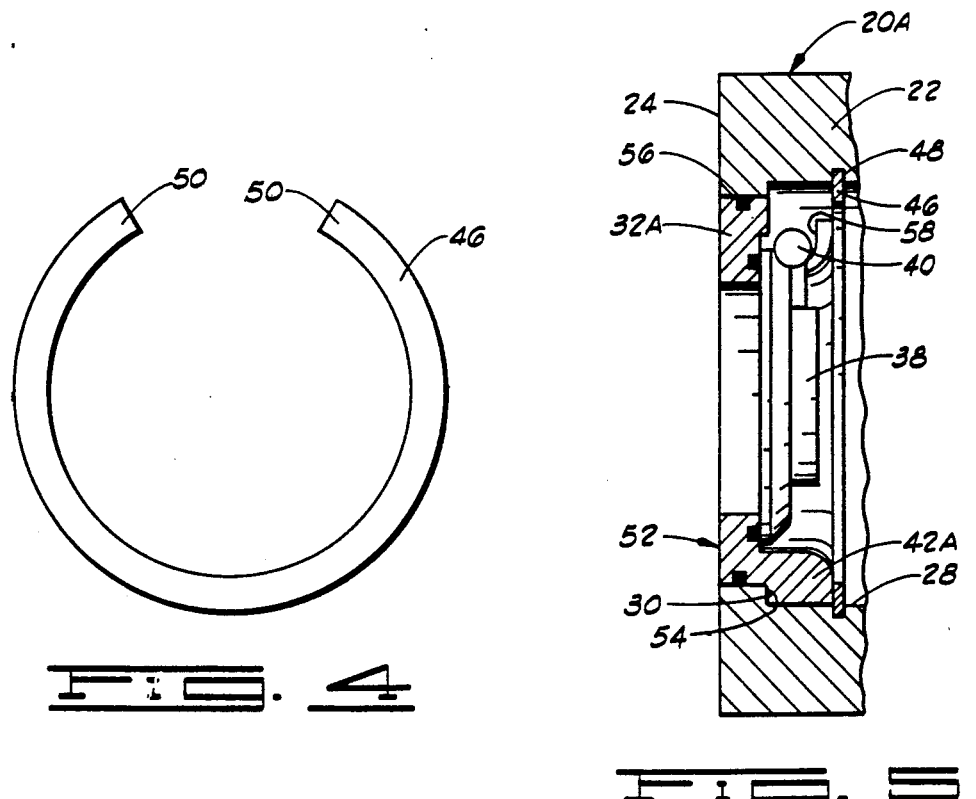

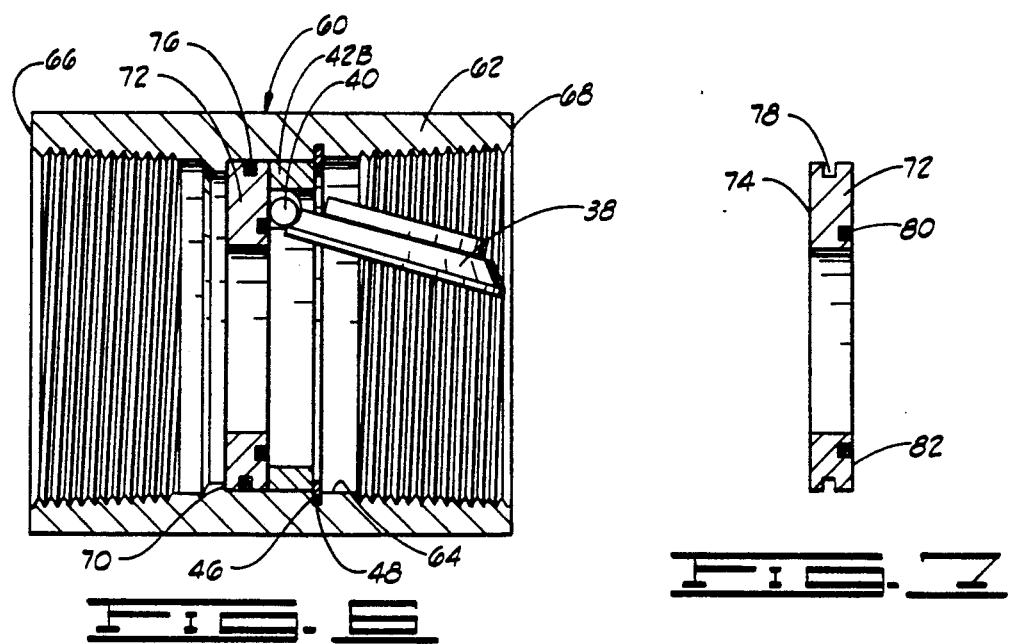
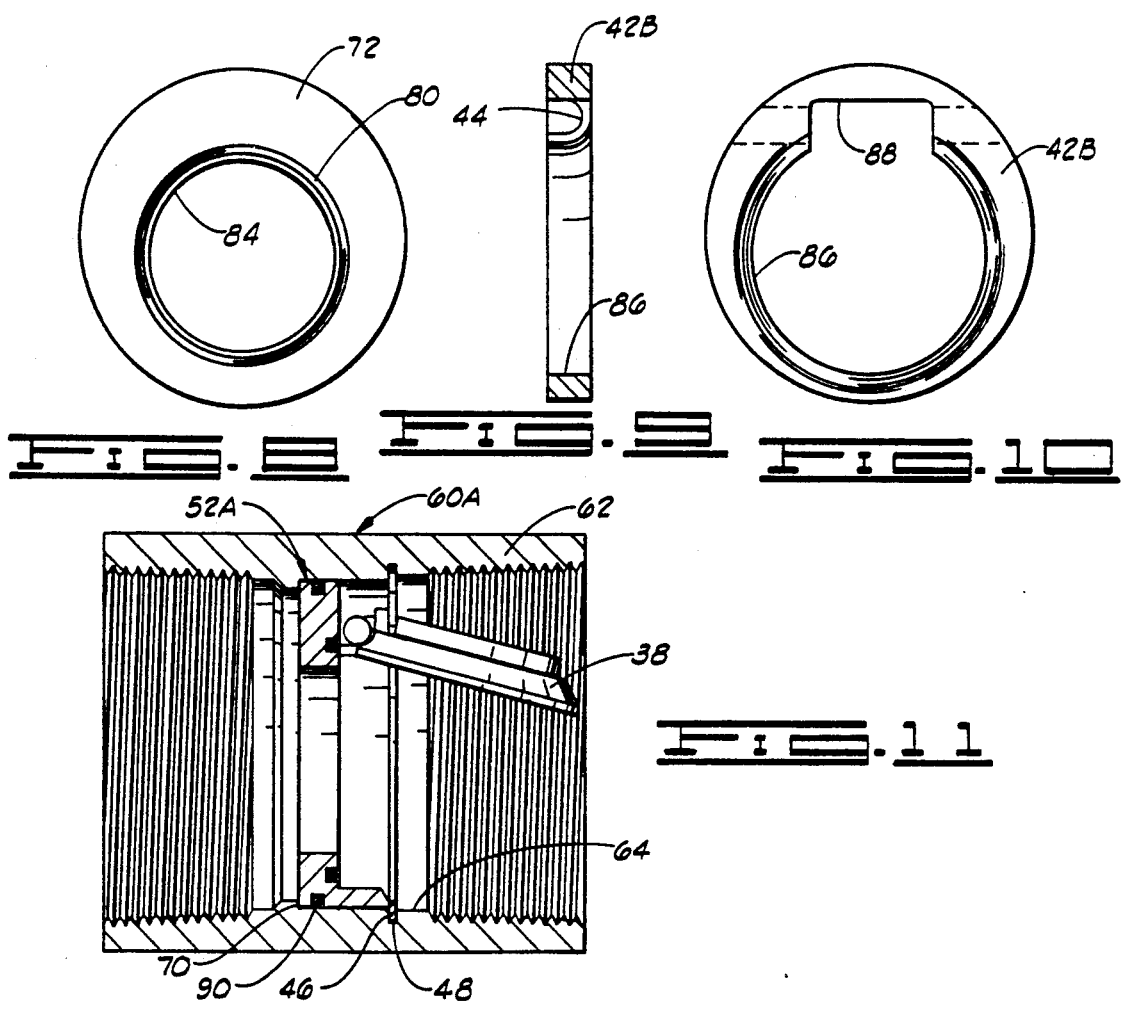

COMPACT SWING CHECK VALVE

CROSS REFERENCES TO RELATED APPLICATIONS

This application is a division of application Ser. No. 07/783,722 filed Oct. 25, 1991, which is a continuation of application Ser. No. 07/430,169 filed Nov. 1, 1989, now abandoned, which is a continuation-in-part of application Ser. No. 286,979 filed Dec. 20, 1988, now U.S. Pat. No. 4,982,759 and entitled Swing Check Valve With Secured Cage. Related subject matter is disclosed in U.S. Pat. Nos. 4,781,212; 4,781,214 and 4,809,739.

BRIEF SUMMARY OF THE INVENTION

1. Field Of The Invention

This invention relates to improvements in swing check valves.

2. Background Of The Invention

Swing check valves having either a separate seat ring and cage ring or a combined seat and cage not formed as a part of the valve body require some means for holding such members in an operating position. Usually, such means is in the form of flanges at the end of the body. However, if flanges are not available, some other means must be provided. In the present invention, such means are in the form of annular abutments formed by shoulders in the valve body and/or by snap rings.

BRIEF DESCRIPTION OF THE DRAWINGS

FIG. 1 is a vertical cross section of a valve constructed in accordance with this invention.

FIG. 2 is a separate cross sectional view of the seat ring member of the valve of FIG. 1.

FIG. 3 is a side elevational view of the cage member of the valve of FIG. 1.

FIG. 4 is an end elevational view of the snap ring used in the valve of FIG. 1.

FIG. 5 is a vertical cross sectional view of a portion of another valve constructed in accordance with this invention.

FIG. 6 is a vertical cross sectional view of another valve constructed in accordance with this invention adapted to be used in a pipe line connected with threads.

FIG. 7 is a separate cross sectional view of the seat ring member of the valve of FIG. 6.

FIG. 8 is an end view of the seat ring member of the valve of FIG. 6.

FIG. 9 is a separate cross sectional view of the cage member of the valve of FIG. 6

FIG. 10 is an end view of the cage member of FIG. 9.

FIG. 11 is a vertical cross sectional view of a valve similar to the valve shown in FIG. 6.

DETAILED DESCRIPTION OF THE DRAWINGS

Figures 12, 13:
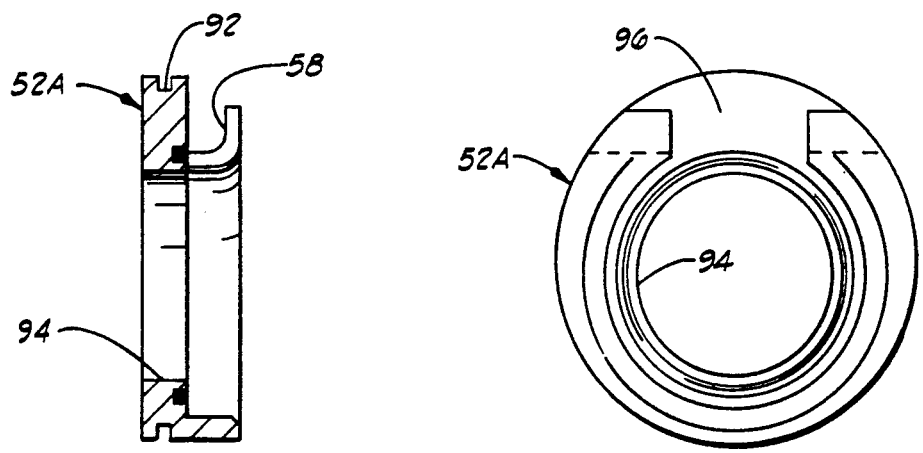
FIG. 12 is a separate cross sectional view of the combined seat ring and cage member of the valve of FIG. 11.
FIG. 13 is an end elevational view of the combined seat ring and cage member of FIG. 12.

Referring to the drawings in detail, and particularly FIGS. 1 through 4, reference character 20 generally designates a valve constructed in accordance with this invention. The valve 20 has a body 22 with planar upstream and downstream ends 24 and 26 and a bore 28 extending therethrough communicating with the upstream and downstream ends 24 and 26. The diameter of the bore 28 is decreased adjacent the end 24 to provide an annular shoulder 30 in the body facing downstream.

A valve seat member 32 fits in the bore 28 near the upstream end 24. The outer diameter of the seat 32 varies to provide an annular shoulder 34 mating with the shoulder 30. A sealing ring 35 fits in a mating groove in the shoulder 34 to sealingly engage the annular shoulder 30 and prevent the leakage of fluid around the seat member 32. The seating face of the seat member 32 contains a sealing ring 36 to sealingly engage a disc 38 of the type shown in U.S. Pat. No. 4,781,214 which has a pair of hinge pins 40 (only one of which is shown) protruding therefrom.

The disc 38 is supported in a cage member 42 for swinging movement toward and away from the seat member 32. The cage member 42 is in the form of a ring having an outer diameter of a size to provide a sliding fit in the bore 28. A pair of hinge pin recesses 44 are formed in the face of the cage 42 facing the seat 32 sized to receive the hinge pins 40 and pivotally support the disc 38. With this arrangement, the hinge pins 40 are trapped in the hinge pin recesses 44 by the seat 32.

A retainer ring 46 fits in a mating groove 48 formed in the wall of the bore 28. The groove 48 is located such that the retainer ring 46 engages the downstream end of the cage 42 when the cage and seat are in abutting relation and the annular shoulders 30 and 34 are engaged. The retainer ring 46 is in the form of a snap ring with the free ends 50 of the ring spaced from one another as shown in FIG. 4.

In operation, fluid flows through the valve from the upstream end 24 to the downstream end 26 with the disc 38 swung counterclockwise from the position shown in FIG. 1. When the direction of fluid flow attempts to reverse, the disc 38 swings in a clockwise direction into the closed position against the seat 32 as shown in FIG. 1. Some force is thus imposed on the seat 32, urging the seat upstream. This force is resisted by the body shoulder 30. Thus, it is not necessary to rely upon an outside member, such as a pipe flange (not shown) at the upstream end of the valve. It will also be noted that downstream forces imposed on the seat and cage are resisted by the retainer ring 46.

FIG. 5 illustrates a modified valve 20A, with only the upstream end portion 24 of the valve body 22 being shown. In this embodiment, the valve seat member 32A and cage member 42A are formed as part of one member generally designated by reference character 52. The member 52 has an annular shoulder 54 formed on the outer periphery thereof to mate with the shoulder 30 in the valve body 22 and prevent the member 52 from moving upstream upon closure of the valve which occurs upon a reversal of flow as discussed in detail above. A suitable sealing ring 56 is fitted in a mating groove in the outer periphery of the smaller outer diameter portion of the member 52 to sealingly engage the smaller diameter portion of the bore 28 through the body 22 and prevent the leakage of fluid around the member 52. Also, the member 52 is held against downstream movement by the retainer member 46 fitting in the mating groove 48 and engaging the downstream end of the member 52.

The valve disc 38 is supported by the hinge pins 40 in bearing areas 58 formed in the cage portion 42A of the member 52. Such bearing areas are shown in detail in U.S. Pat. No. 4,809,739.

FIGS. 6 through 10 disclose a valve 60 of the type which is designed to be inserted between adjacent sections of threaded pipe, rather than between flanges as was the case with the valves 20 and 20A. The valve body 62 of the valve 60 is tubular in shape having an internal bore 64 communicating with the upstream and downstream ends 66 and 68 of the valve body. The bore 64 is threaded adjacent the upstream and downstream ends of the body to receive the respective end portions of the adjacent pipe sections (not shown). The diameter of the bore 64 is also varied in the central portion of the valve body to form a downstream facing annular shoulder 70 in the valve body.

A valve seat member 72 slidingly fits in the body bore 64 with the outer portion of the upstream face 74 of the member 72 in a butting relationship with the shoulder 70 in the valve body. A sealing ring 76 fits in a mating groove 78 in the outer periphery of the seat member 72 to sealingly engage the wall of the bore 64 and prevent the leakage of fluid around the seat member 72. Another sealing ring 80 is provided in the downstream, seating face 82 of the seat member 72 to be engaged by the disc 38.

As shown in FIG. 8, the flow passageway 84 through the seat member 72 is offset from the center line of the valve body 62, which will allow the valve disc 38 to swing sufficiently out of the way to provide a full opening valve. The sealing ring 80 encircles the passageway 84 to be sealing engaged by the disc 38.

A slightly modified ring-shaped, cage member 42B is slidingly positioned in the body bore 64 in contact with the downstream end of the valve seat member 72. The cage member 42B is modified in that the flow passageway 86 therethrough is offset from the center line of the valve body bore 64 and is in alignment with the passageway 84 through the seat member 72. Also, a portion of the cage member 42B between the hinge pin bearing areas 44 is removed to provide an opening 88 to accommodate a portion of the disc 38 when the disc 38 is swung into a fully open position.

A retainer member 46 is positioned in a mating groove 48 in the wall of the valve body bore 64 in a position to engage the downstream end of the cage member 42B. Thus, annular abuttments prevent both upstream and downstream movements of the seat member 72 and cage member 42B.

A slightly modified valve 60A is illustrated in FIGS. 11 through 13. The valve 60A has the same valve body 62. In the valve 60A, however, the seat portion and cage portion are formed as a single ring member 52A in the form of a slight modification of the member 52 previously described in connection with FIG. 5. The member 52A is modified in having a substantially uniform outer diameter to slidingly fit in the bore 64 of the valve body and against the shoulder 70. A suitable sealing ring 90 is provided in a mating annular groove 92 formed in the outer periphery of the member 52A to sealingly engage the wall of the bore 64. The flow passageway 94 through the member 52A is offset from the center line of the valve body bore 64 as shown in FIGS. 12 and 13, similar to the offsetting of the flow passageways 84 and 86 in the valve 60, such that the disc 38 can be swung to a fully open position when the valve body 62 is secured between mating pipe sections. The hinge pin bearing areas 58 are positioned to properly support the disc 38 for its opening and closing movements, and a portion of the cage member part of the member 52A is removed between the bearing areas 58 to provide an opening 96 for accommodating the full swinging movement of the disc 38.

It will be apparent from the foregoing that the valve 60A also provides annular abutments to prevent both upstream and downstream movement of the working parts of the valve, without relying upon any engagement between these members and adjacent pipe sections.

Figure 14:
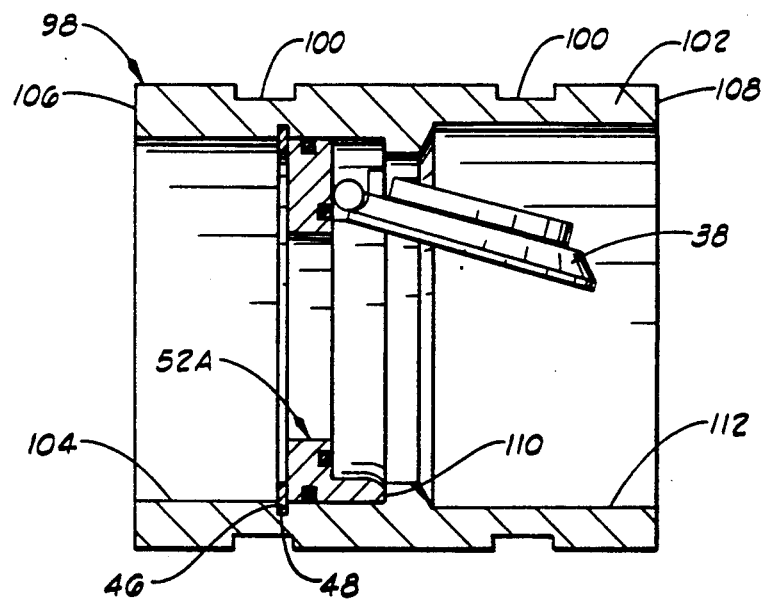
FIG. 14 is a vertical cross sectional view of another valve constructed in accordance with this invention.

FIG. 14 discloses another valve, generally designated by the reference character 98, having grooves 100 in the outer periphery of the valve body 102 for what are known in the art as grooved end connection valves. In this embodiment, the bore 104 extending through the valve body 102 between the upstream and downstream ends 106 and 108 is varied in diameter to provide an annular shoulder 110 therein facing upstream. Thus, the combination seat and cage member 52A can be inserted into the valve body 102 from the upstream end of the body, rather than through the downstream end as was the case with the valve 60A. Also, a retainer ring member 46 fits in a mating groove 48 positioned upstream of the shoulder 110 to engage the upstream end of the member 52A, such that the member 52A will be prevented from either upstream or downstream movement in the valve 98. Finally, the portion 112 of the valve body bore 104 between the smaller diameter portion of the valve body forming the shoulder 110 is offset from the center line of the remainder of the bore 104 to accommodate a full opening movement of a the disc 38.

Figure 15:
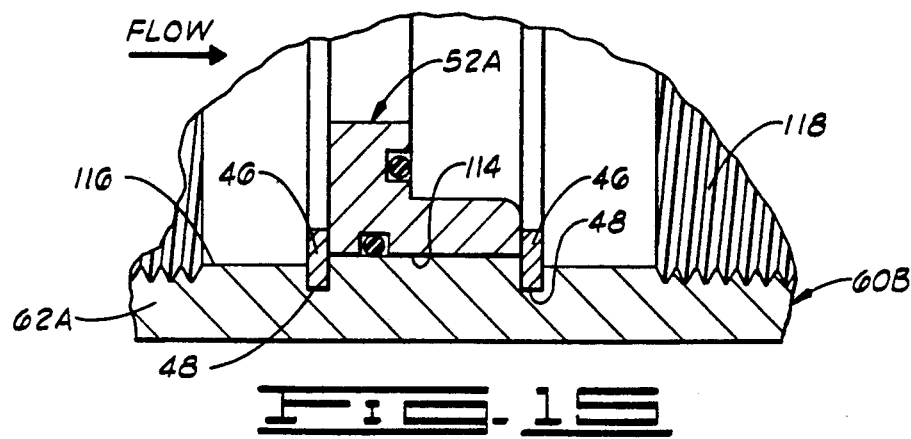
FIG. 15 is an enlarged partial cross sectional view of another means for holding the combined seat and cage member of the valve of FIG. 14.

FIG. 15 shows only a portion of a further modified valve 60B. The valve body 62A of the valve 60B has a reduced diameter portion 114 in the body bore 116 to slidingly receive the combination seat and cage member 52A, such that the member 52A can be inserted from either end of the valve and will be of sufficient size to clear the threads 118 when so inserted through either end of the valve body. In this embodiment, a pair of retainer rings 46 are provided in the valve body in mating grooves 48 at the upstream and downstream ends of the reduced diameter portion 114 to engage the upstream and downstream ends of the member 52A and prevent movement of member 52A upon opening and closing of the valve. Thus, in this embodiment, the annular abutments for preventing such upstream and downstream movement are provided by a pair of retainer rings.

Figure 16:
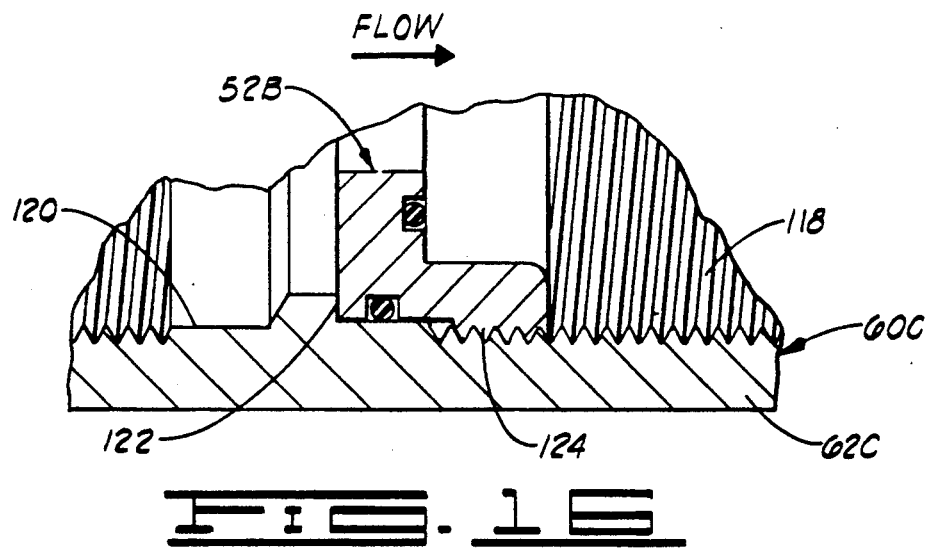
FIG. 16 is another enlarged partial cross sectional view of another means for holding a combined seat and cage in position in a valve body.

FIG. 16 discloses a further modified valve 60C to support a modified combination seat and cage member 52B. In this case, the inner diameter of the body bore 120 is reduced in diameter in the central portion of the valve body to provide the downstream facing annular shoulder 122. A portion 124 of the outer periphery of the modified member 52B is externally threaded to engage the threads 118 extending from the downstream end of the valve body 62C. With this arrangement, the mating threads 118 and 124 provide mating annular abutments adjacent the downstream end of the member 52B; and the upstream end of the member 52B and the annular shoulder 122 provide annular abutments at the upstream end of the member 52B.

Figure 17:
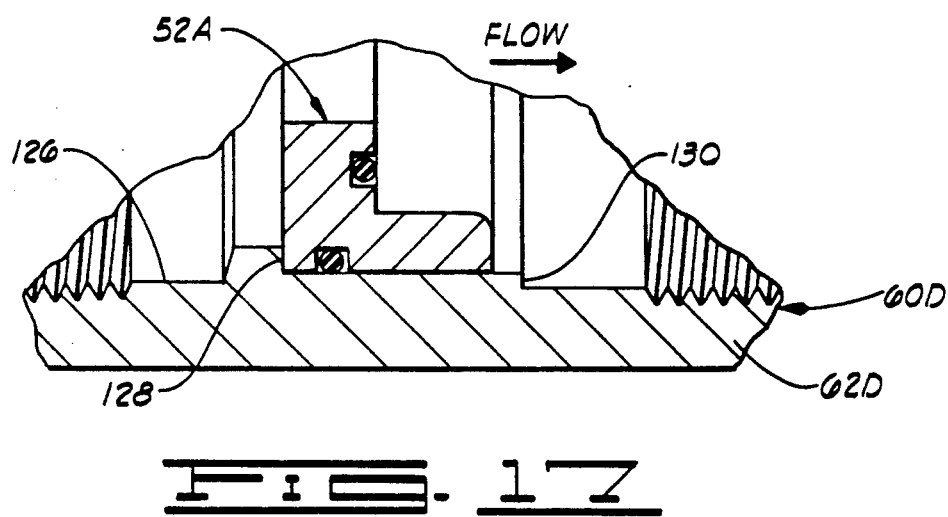
FIG. 17 is an enlarged cross sectional view of a portion of a valve illustrating an intermediate step in securing a combined seat and cage member in a valve body.
Figure 18:
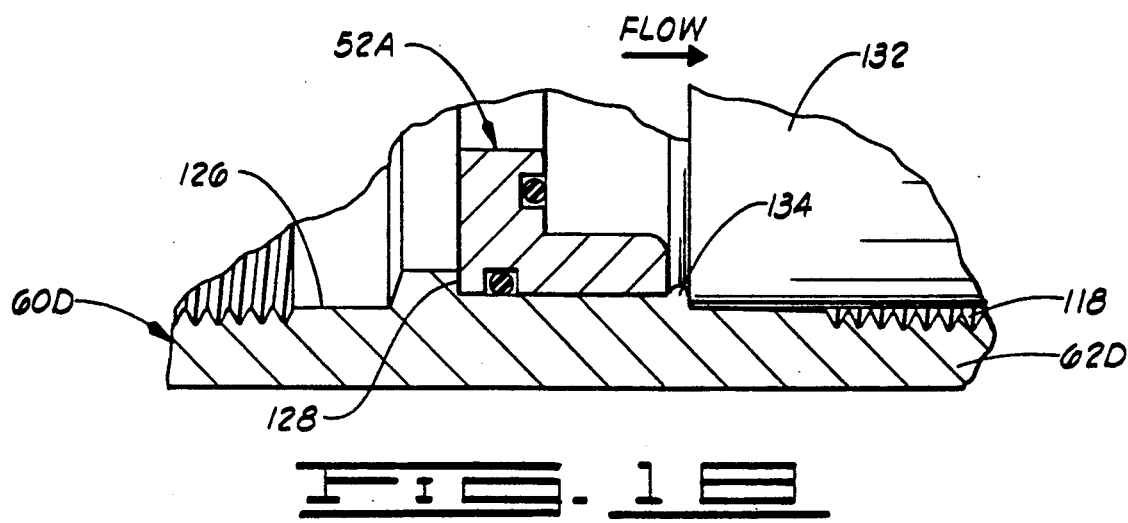
FIG. 18 is an illustration of a further step in securing a combined seat and cage in a valve body following the illustration in FIG. 17.

FIGS. 17 and 18 disclose another form of valve 60D, showing another technique for securing the combination seat and cage member 52A in position in the valve body 62D. In this case, the inner diameter of the valve body bore 126 is varied in diameter to provide a first annular downstream facing shoulder 128 in the generally central portion of the valve body 62D. The variable inner diameter of the bore 126 also provides a second annular shoulder 130 in spaced relationship with respect to the shoulder 128. The shoulder 130 also faces downstream and is positioned such that a tool 132 can be inserted through the downstream end of the valve body 62D as shown in FIG. 18 to displace a portion of the material of the body 62D to form a ring 134 in the valve body bore against the downstream end of the member 52A. By this means, upstream movement of the member 52A is prevented by the shoulder 128 and downstream movement is prevented by the annular ridge or ring 134 in the valve body bore. It will be understood that the diameter of the threads 118 in the downstream end of the valve body are sized sufficiently for free insertion of the tool 132 into the valve body for forming the ridge 134.

Changes may be made in the combination and arrangement of parts or elements as shown in the drawing and described in the specification without departing from the spirit and scope of the invention as defined in the following claims.

What is claimed is:

1. A swing check valve, comprising:
   a body having upstream and downstream ends and a bore therethrough interconnecting the upstream and downstream ends, the bore having an annular shoulder facing downstream and an annular groove located downstream from the annular shoulder thereof;
   a seat ring in the bore insertable through the downstream end of the bore and having an upstream end, a downstream end, an annular shoulder on the outer periphery thereof facing upstream, and a valve seat portion providing a seating face facing downstream;
   a cage ring in the bore insertable through the downstream end of the bore and having upstream and downstream ends, the upstream end of the cage ring being sized to engage the downstream end of the seat ring to retain the cage ring downstream from the seat ring in the bore;
   a disc pivotally supported by the cage ring and sized to mate with the seating face to prevent flow upstream through the valve; and
   a retainer ring mounted in the annular groove in the bore and engaging the downstream end of the cage ring to hold the cage ring and the seat ring against downstream movement in the body;
   wherein the annular shoulder of bore mates with the annular shoulder on the seat ring to prevent upstream movement of the seat ring and the cage ring and wherein the annular shoulder of the bore is positioned to locate the downstream end of the cage ring in spaced relation from the downstream end of the body.

2. The swing check valve of claim 1 wherein the annular groove in the bore positions the upstream end of the cage ring in abutment with the downstream end of the seat ring and wherein the annular groove positions the annular shoulder of the seat ring in abutment with the annular shoulder of the bore.

3. The swing check valve of claim 1 wherein the annular shoulder of the bore is formed by a reduction in the diameter of the bore extending from the annular shoulder to the upstream end of the body.

4. The swing check valve of claim 1 wherein the annular shoulder of the bore is formed by a reduction in the diameter of the bore and wherein the diameter of the bore increases upstream from the annular shoulder of the bore.

5. The swing check valve of claim 1 wherein the outer periphery of the upstream end of the seat ring has a groove holding a sealing ring engaging the bore to prevent leakage of fluid around the seat ring.

6. The swing check valve of claim 1 wherein the outer periphery of the upstream end of the seat ring has a groove holding a sealing ring engaging the annular abutment of the bore to prevent leakage of fluid around the seat ring.

* * * * *